United States Patent
Ahn

(10) Patent No.: US 8,223,971 B2
(45) Date of Patent: Jul. 17, 2012

(54) APPARATUS AND METHOD FOR ENCRYPTING SECURITY KEY IN MOBILE COMMUNICATION TERMINAL

(75) Inventor: Chi-Hun Ahn, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 1475 days.

(21) Appl. No.: 11/799,960

(22) Filed: May 3, 2007

(65) Prior Publication Data

US 2008/0019521 A1    Jan. 24, 2008

(30) Foreign Application Priority Data

May 30, 2006    (KR) .......................... 10-2006-0048530

(51) Int. Cl.
*G06F 21/00* (2006.01)
(52) U.S. Cl. ........................... 380/277; 380/44; 713/193
(58) Field of Classification Search ........................ None
See application file for complete search history.

(56) References Cited

U.S. PATENT DOCUMENTS

| | | | | |
|---|---|---|---|---|
| 4,281,216 A * | 7/1981 | Hogg et al. | .................. | 380/277 |
| 5,550,809 A | 8/1996 | Bottomley et al. | | |
| 5,703,948 A | 12/1997 | Yanovsky | | |
| 6,138,005 A * | 10/2000 | Park | .............. | 455/411 |
| 6,799,155 B1 | 9/2004 | Lindemann et al. | | |
| 6,978,021 B1 * | 12/2005 | Chojnacki | ..................... | 380/202 |
| 7,333,614 B2 | 2/2008 | Jarosinski et al. | | |
| 7,564,908 B2 * | 7/2009 | Luz et al. | ....................... | 375/260 |
| 2002/0187808 A1 | 12/2002 | Vallstrom et al. | | |
| 2003/0095662 A1 * | 5/2003 | Jarosinski et al. | ............ | 380/268 |
| 2004/0081320 A1 * | 4/2004 | Jordan et al. | .................. | 380/247 |
| 2004/0097217 A1 * | 5/2004 | McClain | ....................... | 455/411 |
| 2004/0174812 A1 * | 9/2004 | Murakami et al. | ............ | 370/215 |
| 2004/0193364 A1 * | 9/2004 | Chojnacki | ..................... | 701/200 |
| 2005/0221801 A1 | 10/2005 | Liu et al. | | |

FOREIGN PATENT DOCUMENTS

| | | |
|---|---|---|
| CN | 1117227 | 2/1996 |
| CN | 1611093 | 4/2005 |
| EP | 0 565 506 | 4/1993 |
| GB | 2 376 386 | 12/2002 |
| JP | 2004147187 | 5/2004 |
| JP | 2004297814 | 10/2004 |
| KR | 10-0166940 | 9/1998 |
| WO | WO 01/76298 | 10/2001 |

OTHER PUBLICATIONS

Digital Cellular Telecommunications System (Phase 2+); Personalization of GSM Mobile Equipment (ME); Mobile Functionality Specification, Jan. 1999.

* cited by examiner

*Primary Examiner* — Gilberto Barron, Jr.
*Assistant Examiner* — David Le
(74) *Attorney, Agent, or Firm* — The Farrell Law Firm, P.C.

(57) ABSTRACT

Provided is an apparatus and method for storing a security key in a mobile communication terminal. In the method, the security key is generated randomly. The generated security key is encrypted in a predetermined encryption scheme. The encrypted security key is stored in the mobile communication terminal. Therefore, even if the stored security keys are read by hacking or memory dump, it is impossible to detect the accurate security keys.

9 Claims, 4 Drawing Sheets

US 8,223,971 B2

APPARATUS AND METHOD FOR ENCRYPTING SECURITY KEY IN MOBILE COMMUNICATION TERMINAL

PRIORITY

This application claims priority under 35 U.S.C. §119 to an application filed in the Korean Intellectual Property Office on May 30, 2006 and allocated Serial No. 2006-48530, the contents of which are incorporated herein by reference.

BACKGROUND OF THE INVENTION

1. Field of the Invention

The present invention relates generally to an apparatus and method for storing security keys in a mobile communication terminal, and in particular, to an apparatus and method for encrypting and storing security keys in a mobile communication terminal so as to prevent unauthorized use of the security keys.

2. Description of the Related Art

In general, a Universal Mobile Telecommunications System/Global System for Mobile communication (UMTS/GSM) system provides a personalization function for allowing a specific terminal to use only a specific Subscriber Identity Module (SIM) card. Examples of the personalization are network personalization, network subset personalization, service provider personalization, corporate personalization, and SIM/USIM (Universal SIM) personalization that are defined in the 3rd Generation Partnership Project (3GPP).

The personalization function allows a specific terminal to use only a specific SIM card, by using an International Mobile Station Identity (IMSI), a General IDentifier 1 (GID 1) or a GID 2 that is stored in the SIM card.

When a personalization function is enabled in a mobile communication terminal, the use of a SIM card is restricted. A prestored control key is used to disable the personalization function of the mobile communication terminal, i.e., to remove the restrictions on the use of the SIM card. The control key is randomly generated using the seed of a process program, and the generated control key is stored in the memory of the mobile communication terminal in the form of a decimal number. The seed of the process program is used to randomly generate not only the control key but also security keys that are used for receiving services such as e-mail and mobile banking.

Recently, hackers have been successful in their attempt to compromise the security of the Internet, thus leading to unauthorized use of the security keys (e.g., control keys) of mobile communication terminals and service providers. Security programs such as the 128-bit Advanced Encryption Standard (AES) algorithm, has been developed to prevent the unauthorized use of the security keys.

A conventional mobile communication terminal generates a security key using the conventional security program and stores the generated security key in its memory. However, the conventional security program merely enhances the security effects on the generation of the security key. Therefore, it is still possible to easily obtain the security key by illegally accessing and dumping the mobile terminal memory. This causes the unauthorized use of the security key and the mobile communication terminal.

SUMMARY OF THE INVENTION

An object of the present invention is to substantially solve at least the above problems and/or disadvantages and to provide at least the advantages below. Accordingly, an object of the present invention is to provide an apparatus and method for preventing unauthorized use of a security key in a mobile communication terminal.

Another object of the present invention is to provide an apparatus and method for encrypting a security key and storing the encrypted security key in a mobile communication terminal.

A further object of the present invention is to provide an apparatus and method for encrypting a security key by orthogonal Walsh code spreading and storing the encrypted security key in a mobile communication terminal.

According to one aspect of the present invention, there is provided a method for storing a security key in a mobile communication terminal, the method includes generating the security key randomly; encrypting the generated security key in a predetermined encryption scheme; and storing the encrypted security key.

According to another aspect of the present invention, there is provided an apparatus for storing a security key in a mobile communication terminal, the apparatus includes a controller for generating the security key randomly and encrypting the generated security key; and a memory unit for storing the encrypted security key.

According to a further aspect of the present invention, there is provided a method for storing a control key for disabling personalization in a mobile communication terminal with a SIM card, the method includes randomly generating the control key; encrypting the generated control key; and storing the encrypted control key.

According to still another aspect of the present invention, there is provided a method for disabling personalization in a mobile communication terminal with a SIM card, the method includes detecting an encrypted control key that is stored and a character string for Walsh covering; decrypting the encrypted control key using a Walsh code index contained in the character string; comparing the decrypted control key with the control key contained in the character string; and disabling the personalization if the decrypted control key is identical to the control key contained in the character string.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for encrypting and storing security keys in a mobile communication terminal, with the aim to prevent unauthorized use of the security keys by memory dump. Security keys refer to keys that are randomly generated by a process program for the security of the mobile communication terminal. In the following description, a control key for disabling personalization of a SIM card is taken as an example of the security key.

Examples of a mobile communication terminal are a cellular phone, a personal communication system (PCS) terminal, a personal data assistant (PDA), an international mobile telecommunications-2000 (IMT-2000) terminal, and a fourth generation (4G) broadband communication terminal. The following description is made in terms of a general structure of the above communication terminals.

Figure 1:
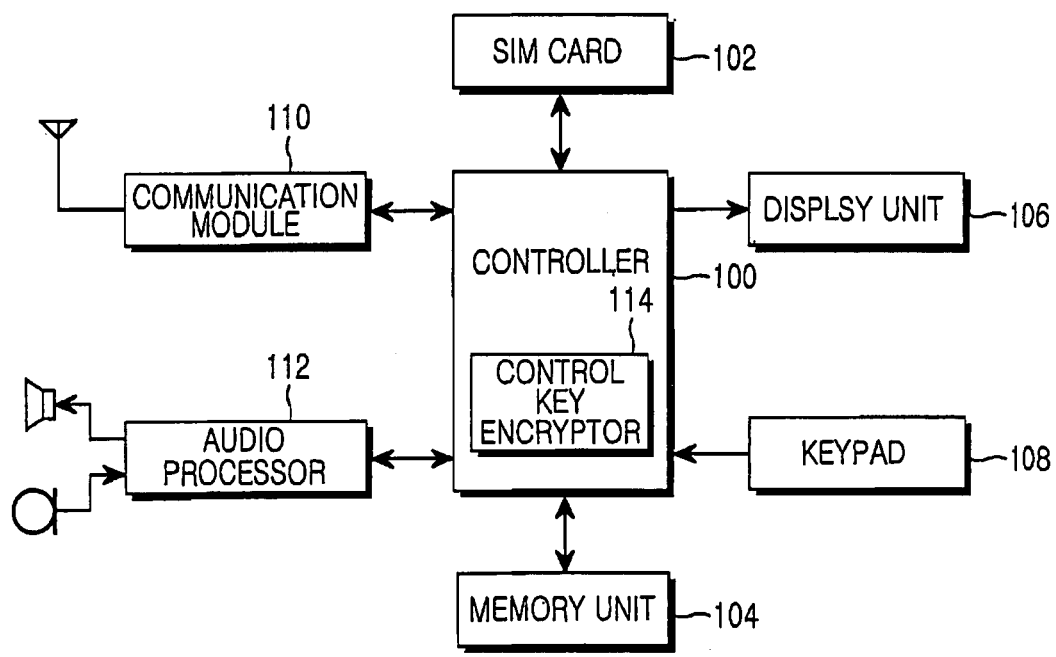
FIG. 1 is a block diagram of a mobile communication terminal according to the present invention.

Referring to FIG. 1, the mobile communication terminal includes a controller 100, a SIM card 102, a memory unit 104, a display unit 110, a keypad 108, a communication module 110, an audio processor 112, a speaker, a microphone, and an antenna. The controller 100 includes a control key encryptor 114.

Controller 100 controls the overall operation of the mobile communication terminal. For example, controller 100 processes and controls voice communication and data communication. In addition, using control key encryptor 114, controller 100 randomly generates a control key, encrypts the random control key, and stores the encrypted control key in memory unit 104.

SIM card 102 is an attachment to the mobile communication terminal. SIM card 102 includes a microprocessor and a memory chip and stores a variety of user data.

Memory unit 104 stores the program for controlling the overall operation of the mobile communication terminal, temporary data generated during the operation of the mobile communication terminal, system parameters, and a variety of updatable data such as phone book and short message service (SMS) message. In addition, memory unit 104 stores the encrypted control key. At this point, the control key is stored in the non-volatile area of memory unit 104.

Display unit 106 displays status information generated during an operation of the mobile terminal, characters inputted by a user, moving pictures, still pictures, and so on.

Keypad 108 includes numeric keys of digits 0-9 and a plurality of function keys, such as, a Talk key, Navigation keys (▲/▼/◀/▶), and a Confirmation key. Keypad 108 provides controller 100 with key input data that corresponds to a key pressed by the user.

Communication module 110 processes radio-frequency (RF) signals that are transmitted/received through the antenna. Audio processor 112 connected to controller 100, and the speaker and the microphone connected to audio processor 112 constitute an audio input/output block that is used for voice communication.

Figure 2:
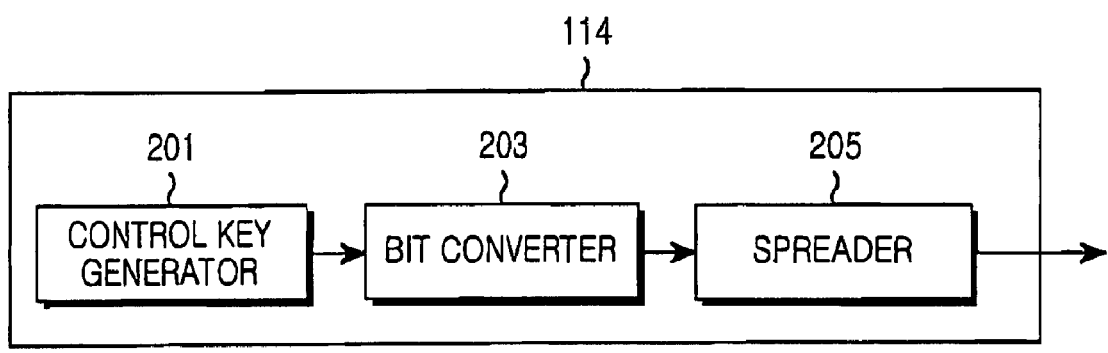
FIG. 2 is a block diagram of a control key encryptor according to the present invention.

Referring to FIG. 2, control key encryptor 114 includes a control key generator 201, a bit converter 203, and a spreader 205.

Using a process program, control key generator 201 generates the control key randomly. The generated control key is an 8-digit number expressed as Equation (1):

$$\text{Control key} = C_0, C_1, C_2, C_3, C_4, C_5, C_6, C_7 \qquad (1)$$

where $C_i$ denotes the $i^{th}$ code of the control key and is a decimal number.

Bit converter 203 converts the generated decimal control key from control key generator 201 into a bit-format expressed as Equation (2) by a bitwise operation:

$$\begin{aligned}
&C_0: b_{00}, b_{01}, b_{02}, b_{03}, b_{04}, b_{05}, b_{06}, b_{07}\\
&C_1: b_{10}, b_{11}, b_{12}, b_{13}, b_{14}, b_{15}, b_{16}, b_{17}\\
&C_2: b_{20}, b_{21}, b_{22}, b_{23}, b_{24}, b_{25}, b_{26}, b_{27}\\
&C_3: b_{30}, b_{31}, b_{32}, b_{33}, b_{34}, b_{35}, b_{36}, b_{37}\\
&C_4: b_{40}, b_{41}, b_{42}, b_{43}, b_{44}, b_{45}, b_{46}, b_{47}\\
&C_5: b_{50}, b_{51}, b_{52}, b_{53}, b_{54}, b_{55}, b_{56}, b_{57}\\
&C_6: b_{60}, b_{61}, b_{62}, b_{63}, b_{64}, b_{65}, b_{66}, b_{67}\\
&C_7: b_{70}, b_{71}, b_{72}, b_{73}, b_{74}, b_{75}, b_{76}, b_{77}
\end{aligned} \qquad (2)$$

where $b_{i,j}$ denotes the $j^{th}$ bit of the $i^{th}$ code of the control key.

Using an orthogonal Walsh code expressed as Expression (3) below, spreader 205 spreads the bits of the control key into random data expressed as Equation (3) and Equation (4).

$$\text{Walsh code} = [W_0, W_1, W_2, W_3, W_4, W_5, W_6, W_7] \qquad (3)$$

where $W_i$ denotes the $i^{th}$ Walsh code that is represented in the form of a row vector, and said code has a length of 8.

$$\begin{aligned}
&S_0: s_{00}, s_{01}, s_{02}, s_{03}, s_{04}, s_{05}, s_{06}, s_{07}\\
&S_1: s_{10}, s_{11}, s_{12}, s_{13}, s_{14}, s_{15}, s_{16}, s_{17}\\
&S_2: s_{20}, s_{21}, s_{22}, s_{23}, s_{24}, s_{25}, s_{26}, s_{27}\\
&S_3: s_{30}, s_{31}, s_{32}, s_{33}, s_{34}, s_{35}, s_{36}, s_{37}\\
&S_4: s_{40}, s_{41}, s_{42}, s_{43}, s_{44}, s_{45}, s_{46}, s_{47}\\
&S_5: s_{50}, s_{51}, s_{52}, s_{53}, s_{54}, s_{55}, s_{56}, s_{57}\\
&S_6: s_{60}, s_{61}, s_{62}, s_{63}, s_{64}, s_{65}, s_{66}, s_{67}\\
&S_7: s_{70}, s_{71}, s_{72}, s_{73}, s_{74}, s_{75}, s_{76}, s_{77}\\
&E: e_0, e_1, e_2, e_3, e_4, e_5, e_6, e_7
\end{aligned} \qquad (4)$$

where $S_i$ denotes diffused random data of the $i^{th}$ code of the control key, $s_{i,j}$ denotes a Walsh-spread random value of the $j^{th}$ bit of the $i^{th}$ code of the control key, and E denotes a row vector of random data generated by Walsh-spreading the control key.

The $s_{i,j}$ can be calculated using Equation Expression (5) below and the $e_i$ can be calculated using Equation (6) below.

$$\begin{aligned}
s_{00} &= b_{00} \cdot W_0 \\
s_{01} &= b_{01} \cdot W_0 \\
&\vdots \\
s_{70} &= b_{70} \cdot W_7 \\
s_{71} &= b_{71} \cdot W_7
\end{aligned} \qquad (5)$$

where $s_{i,j}$ denotes a Walsh-spread random value of the $j^{th}$ bit of the $i^{th}$ code of the control key, $b_{i,j}$ denotes the $j^{th}$ bit of the $i^{th}$ code of the control key, and $W_i$ denotes the $i^{th}$ Walsh code $$e_i = s_{0i} + s_{1i} + \ldots + s_{7i} \qquad (6)$$

where $s_{i,j}$ denotes a Walsh-spread random value of the $j^{th}$ bit of the $i^{th}$ code of the control key.

Spreader 205 provides memory unit 104 with the random data E generated by Equation (4).

Figure 3:
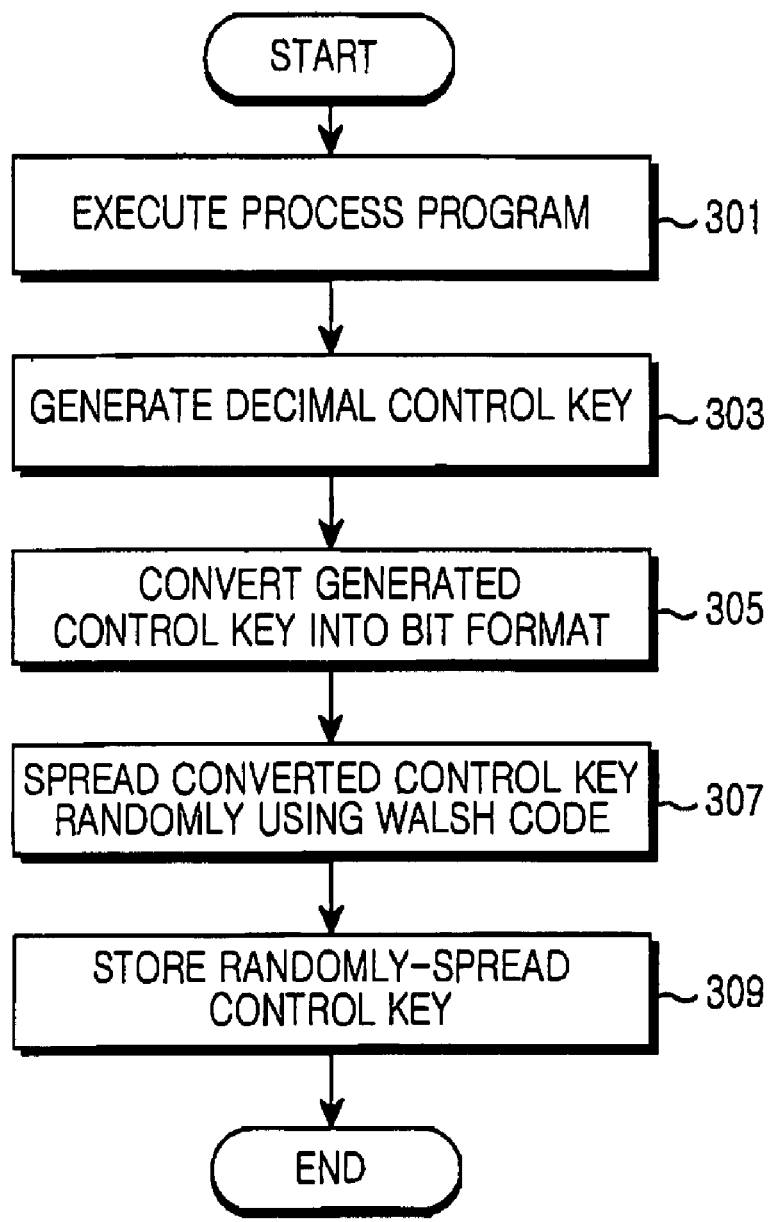
FIG. 3 is a flowchart illustrating a procedure for encrypting a control key according to the present invention.

Referring to FIG. 3, controller 100 executes a program to generate a control key that is used to disable personalization of a SIM card, in step 301.

In step 303, controller 100 generates a random control key. The random control key is a decimal number expressed as Equation (1).

In step 305, controller 100 converts the decimal random key into a bit-format expressed as Equation (2).

In step 307, controller 100 spreads the bit-format control key using the Walsh code. The orthogonal Walsh code expressed as Equation (3) is used to spread the bit-format control key into random data expressed as Equation (4).

In step 309, controller 100 stores the spread random data in memory unit 104. Thereafter, controller 100 ends the procedure.

As described above, controller 100 generates the random control key, the orthogonal Walsh code is used to spread the random-control key into the random data, and the random data is stored in memory unit 104. Therefore, even if memory unit 104 is illegally accessed and dumped to read the stored control key, an accurate control key cannot be detected without the use of accurate Walsh covering.

Figure 4:
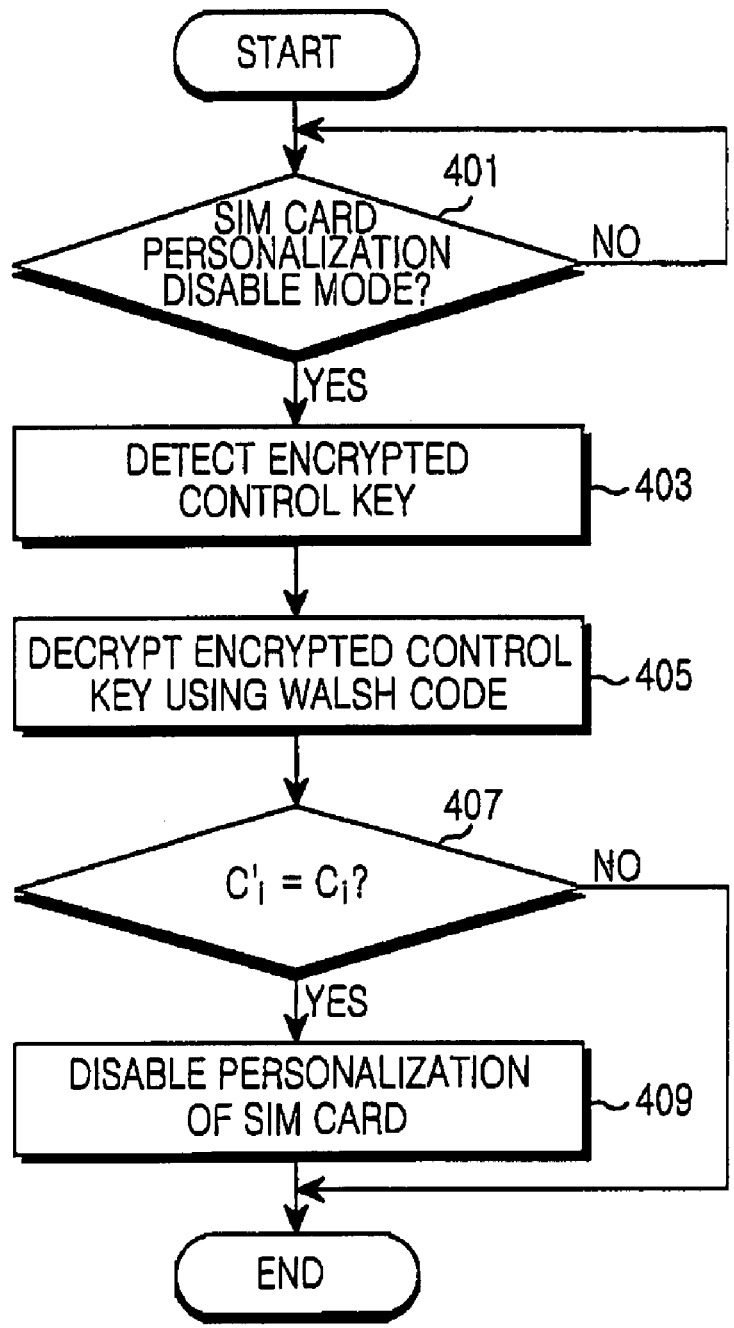
FIG. 4 is a flowchart illustrating a procedure for disabling personalization of a SIM card according to the present invention.

Referring to FIG. 4, controller 100 detects if a SIM card personalization disable mode is selected.

If the SIM card personalization disable mode is selected, controller 100 detects if an encrypted control key is stored in memory unit 104, in step 403.

In step 405, controller 100 decrypts the encrypted control key using the Walsh code index expressed as Equation (7):

$$01234567 = C_0, C_1, C_2, C_3, C_4, C_5, C_6, C_7 \quad (7)$$

where "01234567" denotes a Walsh code index that is used to perform a Walsh covering operation for decrypting the codes of the control key, and "$C_i$" denotes a control key that is to be compared with a control key ($C'_i$) decrypted using the Walsh code index.

For example, in order to decrypt the first code $C_0$ of the control key, the random data E stored in memory unit 104 is multiplied by the first Walsh code index '0' as expressed by Equation (8) below.

$$b0i' = E \cdot W_0 \quad (8)$$

where $b_{0i}$ denotes the $i^{th}$ bit of the first code of the control key, E denotes the random data (i.e., the encrypted control key) stored in memory unit 104, and $W_0$ denotes the first Walsh code index. Because the Walsh codes are orthogonal to one another, they have a value of 0 if Walsh codes other than those for Walsh code spreading are used. Therefore, it is possible to decrypt only a value for the corresponding Walsh code index.

As shown in Equation (8), the eight bits of the first code of the control key are recovered using the Walsh covering operation. When the recovered eight bits are converted into a decimal number, the first code $C_0'$ of the control key is recovered.

In the above way, all the encrypted control keys are decrypted using the Walsh code index. In step 407, the decrypted control key ($C'_0, C'_1, C'_2, C'_3, C'_4, C'_5, C'_6, C'_7$) is compared with the control key ($C_0, C_1, C_2, C_3, C_4, C_5, C_6, C_7$). If the decrypted control key is identical to the control key, controller 100 depersonalizing (unlocking) the personalization of the SIM card and then ends the procedure. On the other hand, if the decrypted control key is different from the control key, the controller ends the procedure maintaining the personalization of the SIM card.

As described above, the security keys generated by the process program is encrypted and stored in the mobile communication terminal. Therefore, even if the stored security keys are read by hacking or memory dump, it is impossible to detect the accurate security keys. Accordingly, it is possible to prevent the unauthorized use of the mobile communication terminal.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method for storing a security key in a mobile communication terminal, comprising the steps of:
   generating the security key randomly;
   encrypting the generated security key; and
   storing the encrypted security key,
   wherein encrypting the generated security key comprises:
   converting the generated security key into a bit-format; and
   spreading the bit-format security key by a Walsh code to generate random data, and
   wherein storing the encrypted security key comprises storing the encrypted security key and a Walsh code index corresponding to the Walsh code within a character string that is stored in a memory of the mobile terminal.

2. An apparatus for storing a security key in a mobile communication terminal, comprising:
   a controller for generating the security key randomly and encrypting the generated security key; and
   a memory unit for storing the encrypted security key,
   wherein the controller comprises:
   a security key generator for generating the security key randomly; and
   an encryptor for encrypting the generated security key,
   wherein the encryptor encrypts the generated security key by converting the generated security key into a bit-format, and spreading the bit-format security key by a Walsh code to generate random data, and
   wherein storing the encrypted security key comprises storing the encrypted security key and a Walsh code index corresponding to the Walsh code within a character string that is stored in a memory of the mobile terminal.

3. The apparatus of claim 2, wherein the encrypted security key is stored in a nonvolatile area of the memory unit.

4. A method for storing a control key for disabling personalization in a mobile communication terminal with a Subscriber Identity Module (SIM) card, comprising the steps of:
   generating the control key randomly;
   encrypting the generated control key; and
   storing the encrypted control key,
   wherein encrypting the generated control key comprises:
   converting the generated control key into a bit-format; and
   spreading the bit-format control key by a Walsh code to generate random data, and
   wherein storing the encrypted control key comprises storing the encrypted control key and a Walsh code index corresponding to the Walsh code within a character string that is stored in a memory of the mobile terminal.

5. A method for disabling personalization in a mobile communication terminal with a Subscriber Identity Module (SIM) card, comprising the steps of:
   detecting an encrypted control key that is stored and a character string for Walsh covering;
   decrypting the encrypted control key using a Walsh code index contained in the character string;
   comparing the decrypted control key with a control key contained in the character string; and depersonalizing the personalization if the decrypted control key is identical to the control key contained in the character string, wherein the encrypted control key is encrypted by a Walsh code spreading.

6. A mobile communication terminal for storing a security key comprising:

program process for generating the security key randomly;
means for encrypting the generated security key; and
means for storing the encrypted security key,
wherein the means for encrypting the generated security key includes means for converting the generated control key into a bit-format; and means for spreading the bit-format control key by a Walsh code to generate random data, and
wherein the means for storing the encrypted security key includes means for storing the encrypted security key and a Walsh code index corresponding to the Walsh code within a character string that is stored in a memory of the mobile terminal.

7. A mobile communication terminal with a Subscriber Identity Module (SIM) card for disabling personalization comprising:

software for identifying an encrypted control key that is stored and a character string for Walsh covering;
software for decrypting the encrypted control key using a Walsh code index contained in the character string; and
software for comparing the decrypted control key with a control key contained in the character string,
wherein the encrypted control key is encrypted by a Walsh code spreading.

8. The mobile communication terminal of claim 7, further comprising software for depersonalizing the personalization if the decrypted control key is identical to the control key contained in the character string.

9. The mobile communication terminal of claim 7, further comprising software for maintaining the personalization if the decrypted control key is not identical to the control key contained in the character string.

* * * * *